April 14, 1970  D. J. R. McKAY  3,505,789
POUCH-FILLING MACHINE

Filed Jan. 6, 1969  3 Sheets-Sheet 1

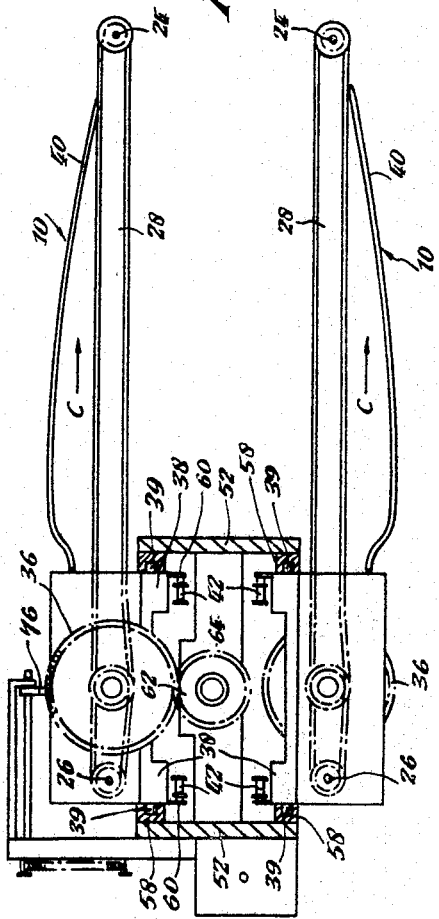

United States Patent Office 3,505,789
Patented Apr. 14, 1970

3,505,789
POUCH-FILLING MACHINE
Donald James Reay McKay, Taunton, England, assignor to Somerwest Limited, Taunton, Somerset, England, a British company
Continuation-in-part of application Ser. No. 633,109, Apr. 24, 1967. This application Jan. 6, 1969, Ser. No. 789,120
Claims priority, application Great Britain, Apr. 28, 1966, 18,659/66; Nov. 16, 1966, 51,325/66
Int. Cl. B65b 5/04, 39/06
U.S. Cl. 53—259
9 Claims

ABSTRACT OF THE DISCLOSURE

A pouch-filling machine comprises a plurality of individual endless conveyors, each arranged so that it is capable of being sheathed from one end by a pouch. Transport means are provided for presenting the other end of each conveyor to a filling station. Drive means are provided for activating each conveyor at the filling station to convey a product presented at the filling station into a pouch prepositioned to sheath the conveyor. Drive means are also provided for activating the conveyor at an ejection station to convey the product off the conveyor at said one end, whereby the filled pouch is ejected from the conveyor.

---

This application is a continuation-in-part of my United States patent application Ser. No. 633,109, filed Apr. 24, 1967, now abandoned.

BACKGROUND OF THE INVENTION

This invention relates to packaging, and more particularly to the packaging of a product in a pouch. The product is usually a foodstuff, such as preweighed portions of bacon, but may be some other commodity. The term "pouch" as used in this specification and claims is intended to cover any flexible bag which has one open end. It is normally made of synthetic plastics film material, but other sheet or film materials are sometimes employed. The open end of the pouch is usually sealed after filling.

Previously, the filling of preformed pouches has normally had to be performed manually because of the difficulty of devising suitable machinery for automated or semiautomated filling. One solution to the problem has been to position the product on a blank of the packaging material, and then to wrap or fold the material around the product to form the package.

SUMMARY OF THE INVENTION

It is an object of the present invention to provide a machine for filling preformed pouches with a desired product.

The present invention provides a pouch-filling machine comprising a plurality of individual endless conveyors, each arranged so that it is capable of being sheathed from one end by a pouch, transport means for presenting the other end of each conveyor in turn to a filling station, drive means for activating each conveyor at said filling station to convey a product presented at the filling station into a pouch prepositioned to sheath the conveyor, drive means for activating each conveyor at an ejection station to convey the product off the conveyor at said one end, whereby the filled pouch is ejected from the conveyor.

The term "endless conveyor" as used herein, is intended to denote the well known type of conveyor which has an endless flexible conveying member, comprising for instance a belt, chain webbing, netting and the like, driven around direction-reversing wheels or rollers at each end of the conveying run. More than one such member working in parallel can be provided in each conveyor.

Figure 1:
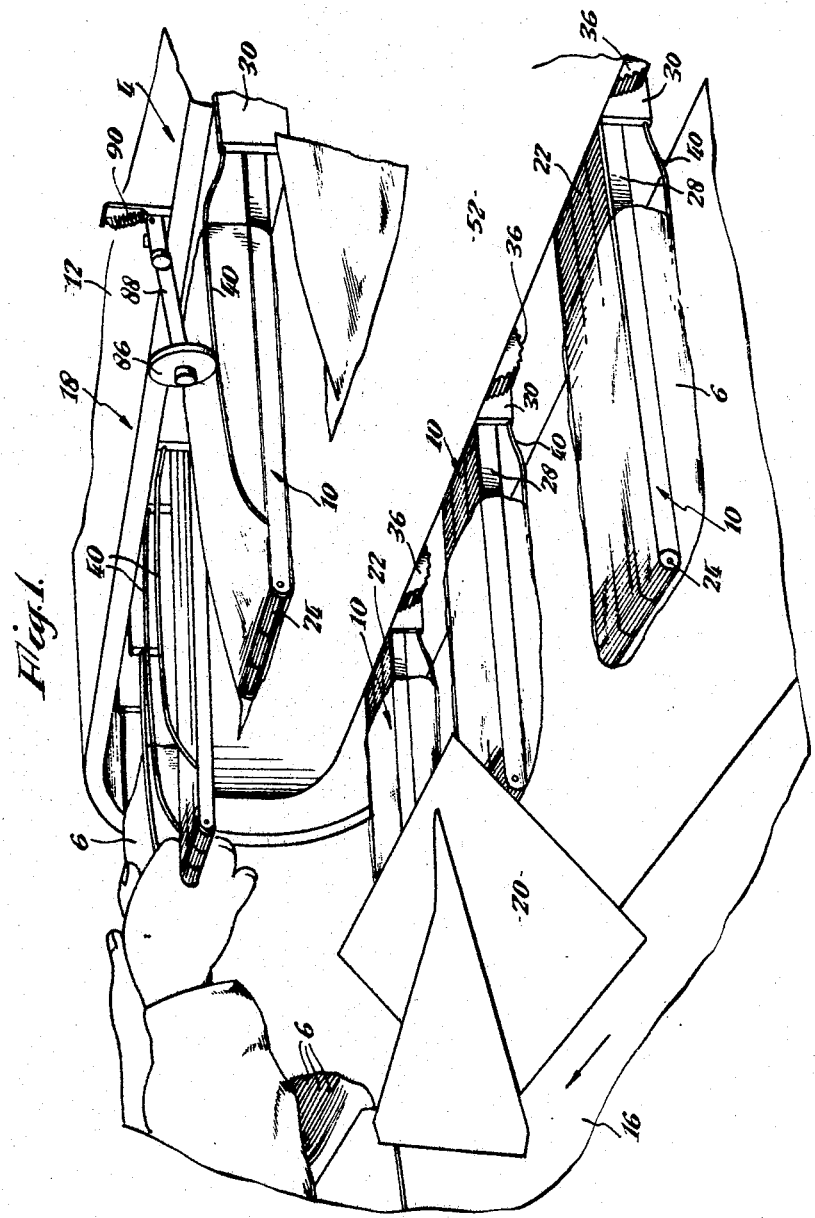
Figure 2:
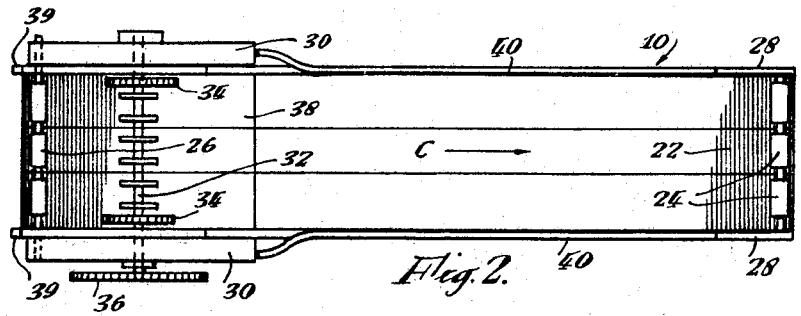
Figure 3:
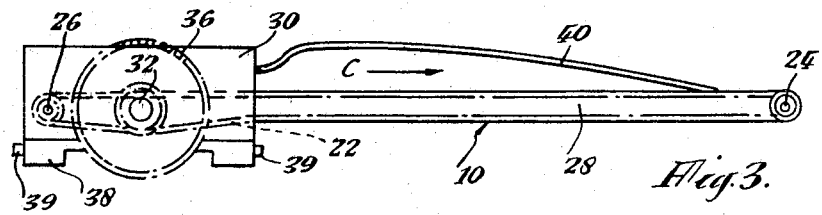
Figure 4:
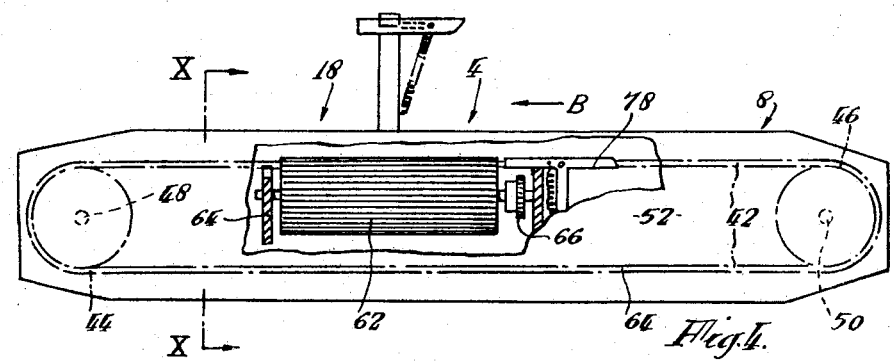
Figure 5:
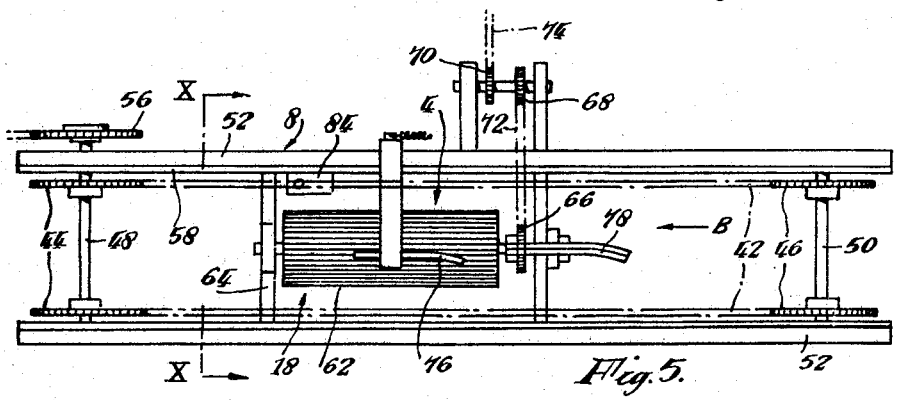

These and other features of the invention will become apparent from the following description of a preferred embodiment of the invention, described with reference to the accompanying drawings, wherein:

FIG. 1 shows a perspective view of a part of the machine,
FIG. 2 shows a plan view of an individual conveyor,
FIG. 3 shows a side view of an individual conveyor,
FIG. 4 shows a side elevation, partly cut away, of a part of the machine, with the cover and the individual conveyors removed.
FIG. 5 shows a plan view of the part shown in FIG. 4.
FIG. 6 shows a cross section on the lines X—X of FIGS. 4 and 5, showing also two individual conveyors in side view, and
FIG. 7 shows a plan view of the general layout of the complete machine.

Referring firstly to the general layout shown in FIG. 7, the upper run of a feed conveyor 2 moves in the direction of arrow A and terminates at the pouch-filling station 4, to which the empty pouches 6 are presented in turn by transport means comprising an endless conveyor 8 (hereinafter called the main conveyor), the upper run of which moves in the direction of arrow B. Each pouch 6 is prepositioned to sheath an individual conveyor 10; a plurality of such individual conveyors 10 being mounted to the main conveyor 8 transversely to the direction of travel of the main conveyor. A protective cover 12 is arranged over the main conveyor 8. A takeoff endless conveyor 16 is arranged adjacent the ejection station 18 which is located a short distance from the filling station, downstream in the direction of arrow B. A ramp 20 is provided to guide the ejected, filled pouches onto the takeoff conveyor.

Referring now also to FIGS. 1 to 6, each individual conveyor 10 comprises a flexible, endless, openwork wire belt 22, reversing around end rollers 24, 26, respectively. The rollers 24 are journalled between the outer end portions of a pair of elongate side members 28. The inner end portions of the side members 28 are secured to a pair of side plates 30. Between the side plates 30 are journalled the rollers 26, and also an axle 32 bearing a pair of sprocket wheels 34, the teeth of which engage the openwork belt 22 to drive it. The axle 32 extends through the side plates 30 and bears at one end a larger sprocket wheel 36 for engaging the drive means. A base plate 38 extends between the lower edges of the side plates 30. The base plate is provided at each opposite end with a pair of projecting bearing rollers 39. A pair of curved rails 40 are disposed one each side of the belt 22 over the side members 28.

The main conveyor 8 comprises a pair of endless chains 42 (shown for clarity in dot-dash lines in FIGS. 4 and 5) arranged in parallel; each chain reversing around end sprocket wheels 44, 46. The pairs of sprocket wheels 44, 46 are borne on axles 48, 50, respectively. The axles are journalled to side plates 52 for the conveyor. The axle 48 is extended on one side and bears a sprocket wheel 56 at that end which takes the drive for the main conveyor 8 from a suitable motor (not shown).

The individual conveyors 10 are mounted to the conveyor 8 by engagement of the bearing rollers 39, in channel-section tracks 58 extending along the upper and lower inside edges of the side plates 52. These tracks are straight and open-ended so that they support the individual conveyors only while moving along the upper and lower runs. The individual conveyors are secured to links of the chains 42 by means of small brackets 60 (see FIG. 6). By this means the individual conveyors are moved along to main conveyor. When the individual conveyors reach the end of either the upper or lower run, the bearing rollers 39 leave the tracks 58, the individual conveyors are supported solely by the chain while moving around the sprocket wheels 44, 46 and the bearing rollers re-enter the tracks for the next horizontal run. The spacing of the individual conveyors along the chains 42 is equal to the distance between the filling station 4 and ejection station 18.

The drive means for activating the individual conveyors at the filling station 4 and ejection station 18 is provided by a single drum 62 having sprocket teeth extending axially along its entire length. The drum is journalled on a horizontal axis between a pair of supporting plates 64 extending between the side plates 52 of the main conveyor. The drum takes its drive through a series of a sprocket wheels 66, 68, 70 and chains 72, 74 from a suitable motor (not shown).

The drum 62 is arranged so that its teeth engage continuously the teeth of the sprocket wheel 36 of each individual conveyor at and between the filling station and ejection station on the upper run of the main conveyor.

The problem of aligning the teeth of the drum 62 and approaching sprocket wheel 36 is solved by the action of a pair of horizontally mounted fingers 76, 78, respectively. The finger 76 is arranged so as to engage the uppermost teeth of a sprocket wheel 36 which is passing below it in engagement with the drum 62 between filling and ejection stations. The finger 78 is arranged so as to engage the lowermost teeth of a sprocket wheel 36 which is approaching the drum 62. The fingers are laterally curved and beveled at their leading end portions so as to be able to engage the teeth of a sprocket wheel 36 at what ever position the teeth may be. The trailing end portions of the fingers are straight and extend axially with respect to the drum 62. A small amount of vertical resilience in the fingers is provided by pivotal spring mounting. There should be virtually no lateral resilience however.

The manner of operation of the machine is as follows. A portion of the product 79, which may be for instance a preweighed portion of bacon, travels towards the filling station 4 on the feed conveyor 2. On the way, the product is collated, by means of a rotatable flanged drum 80 arranged over the conveyor, to ensure that its width is less than that of the pouch into which it is to be filled. Nearer the filling station, the product on the feed conveyor trips a microswitch 82 and this starts the motor for the main conveyor 8.

Because of the spacing of the individual conveyors 10 along the main conveyor, as one individual conveyor approaches the filling station, the next individual conveyor ahead of it will be approaching the ejection station. The sprocket wheel 36 of this latter individual conveyor will be in engagement with both the finger 76 and drum 62; the drum being idle at this time. The finger 76, acting through the sprocket wheel 36, will cause the teeth of the drum 62 to assume a particular position, and the finger 78 is so arranged that its trailing end will be aligned with a tooth of the drum when in this particular position. Thus, the sprocket wheel 36 of the individual conveyor approaching the filling station in engaging the finger 78 will be brought into alignment with the teeth of the drum 62, and can slide from the finger into engagement with the drum at the filling station. At the same time the leading individual conveyor of the two will slide from engagement with the finger 76 and move into the ejection station. At this point it trips a microswitch 84 which starts the motor for the drum 62 and at the same time stops the motor for the main conveyor. There are thus two individual conveyors, one at the ejection station and one at the filling station, in simultaneous activation by the drum 62 which is driven so that the upper run of each of the two individual conveyors moves outwardly (in the direction of arrow C).

Before approaching the filling station, each individual conveyor is sheathed from its outer end by a pouch (see FIG. 1). This can easily be done manually by an operator soon after the individual conveyor leaves the ejection station. The rails 40 serve to keep the mouth of the pouch open. The product reaches the end of the feed conveyor 2 which is located at the filling station so as to be aligned with the inner end of the individual conveyor at that station. The product thus passes from the feed conveyor onto the individual conveyor and is conveyed thereby into the pouch. The pouch is prevented from being ejected at this point by engagement of a rubber-rimmed wheel 86 (see FIG. 1). This wheel is rotatably mounted to one end of an arm 88 which is pivotally mounted to the cover 12 and biassed by a spring 90 so as to bear upon one of the rails 40 of an individual conveyor while at the filling station. The axis of the wheel 86 extends longitudinally of the individual conveyor, so that the pouch sheathing this conveyor is trapped between the rubber rim of the wheel 86 and the rail 40, but the wheel will however rotate to allow the individual conveyor to be moved bodily by the main conveyor away from the filling station.

The activation of the individual conveyors continues until the next portion of product on the feed conveyor trips the microswitch 82. This stops the motor for the drum 62 as well as starting the motor for the main conveyor. The individual conveyor at the filling station, now inactive moves on to the ejection station, and as it does so it aligns the drum 62 for the next individual conveyor in the manner already described. When at the ejection station it trips the microswitch 84, the individual conveyor is reactivated, and since there is no restraining wheel 86 at the ejection station, the product is ejected from the individual conveyor at its outer end taking with it the pouch. The filled pouch falls onto the ramp 20 and thence to the takeoff conveyor 16.

It will be seen that the process is entirely automatic except for manually sheathing the individual conveyors with the empty pouches. It only remains afterwards, to seal the open mouths of the filled pouches.

The foregoing preferred embodiment is given by way of example only, and many other modified embodiments could be devised within the scope of the appended claims. Examples of some possible variations are as follows.

The same or different drive means may be employed at the filling station and ejection station. The two said stations may be spaced apart so that each conveyor has to be moved bodily from the filling station to the ejection station, or alternatively, the two stations may be coincident so that no such bodily movement occurs between filling and ejection. The machine may be arranged to continuously activate each conveyor between filling and ejection or alternatively there may be a period of nonactivation of each conveyor between filling and ejection.

Said transport means may comprise a supporting endless conveyor to which the individual conveyors are mounted transversely to the direction of travel of the supporting conveyor, or alternatively said means may comprise a turntable to which the individual conveyors are generally radially mounted.

The machine could be arranged for mechanically sheathing the individual conveyors with pouches, for instance by forming each pouch about an individual conveyor from a blank of sheet material.

In larger machines more than one filling and ejection station may be provided. For example, two of each station may be provided, an additional feed conveyor being provided and the main conveyor or turntable lengthened and arranged to move two stations at a time so as to present two empty pouches simultaneously to the two filling stations.

What I claim is:

1. A pouch-filling machine comprising a plurality of individual endless conveyors, means arranged with each said conveyor so that it is capable of being sheathed from one end by a pouch, transport means for presenting the other end of each conveyor in turn to a filling station and comprising a main endless conveyor to which the individual conveyors are mounted transversely to the direction of travel of the main conveyor, drive means for activating each conveyor at said filling station to convey a product presented at the filling station into a pouch prepositioned to sheath the conveyor, drive means for activating each conveyor at an ejection station to convey the product off the conveyor at said one end, whereby the filled pouch is ejected from the conveyor.

2. A pouch-filling machine according to claim 1, wherein the ejection station is spaced from the filling station by a distance equal to the spacing of the individual conveyors on said main endless conveyor.

3. A pouch-filling machine according to claim 1, wherein a single drive means is provided to activate the individual conveyors at both the filling and ejection stations.

4. A pouch-filling machine according to claim 3, wherein each individual conveyor is provided with a sprocket wheel for engaging the drive means to activate said individual conveyor, the drive means comprising a driven roller, having peripheral sprocket teeth extending axially along its entire length, and arranged to be engaged by the teeth of the sprocket wheel of each individual conveyor while it is at the filling and ejection stations.

5. A pouch filling machine according to claim 2, wherein each individual conveyor is provided with a sprocket wheel engaging the drive means to activate said individual conveyor, a single drive means being provided to activate the individual conveyors at both the filling and ejection stations, said drive means comprising a driven roller having peripheral sprocket teeth extending axially along its entire length, and arranged to be engaged continuously by the teeth of the sprocket of each individual conveyor while it is at and between the filling and ejection stations.

6. A pouch-filling machine comprising a plurality of individual endless conveyors, means arranged with each said conveyor so that it is capable of being sheathed from one end by a pouch, transport means for presenting the other end of each conveyor in turn to a filling station, drive means for activating each conveyor at said filling station to convey a product presented at the filling station into a pouch prepositioned to sheath the conveyor, drive means for activating each conveyor at an ejection station to convey the product off the conveyor at said one end whereby the filled pouch is ejected from the conveyor, each individual conveyor being provided with a sprocket wheel for engaging said drive means to activate said individual conveyor, said drive means comprising a driven roller having peripheral sprocket teeth arranged to be engaged by the teeth of the sprocket wheel of each individual conveyor.

7. A pouch-filling machine according to claim 6 wherein a single said driven roller provides the drive means for activating each individual conveyor at both the filling and ejection stations.

8. A pouch-filling machine according to claim 6 wherein a single said driven roller provides the drive means for activating each individual conveyor at both the filling and ejection stations, and said transport means comprises a main endless conveyor to which the individul conveyors are mounted transversely to the direction of travel of the main conveyor.

9. A pouch-filling machine according to claim 6 wherein a single said driven roller provides the drive means for activating each individual conveyor at both the filling and ejection stations, said transport means comprises a main endless conveyor to which the individual conveyors are mounted transversely to the direction of travel of the main conveyor, the ejection station is spaced from the filling station in the direction of transport of the main endless conveyor and said single driven roller is arranged to be engaged continuously by the sprocket of each individual conveyor while the individual conveyor is at and between the filling and ejection station.

References Cited

UNITED STATES PATENTS 3,106,051 10/1963 Schild _____ 53—259
3,125,842 3/1964 Ferguson _____ 53—387

TRAVIS S. McGEHEE, Primary Examiner

R. L. SPRUILL, Assistant Examiner

U.S. Cl. X.R.

53—251